(12) United States Patent
Okazaki et al.

(10) Patent No.: US 10,046,393 B2
(45) Date of Patent: Aug. 14, 2018

(54) THREE DIMENSIONAL PRINTER

(71) Applicant: Sodick Co., Ltd., Yokohama (JP)

(72) Inventors: Shuji Okazaki, Yokohama (JP);
Tsuyoshi Saito, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 426 days.

(21) Appl. No.: 14/839,044

(22) Filed: Aug. 28, 2015

(65) Prior Publication Data

US 2016/0107232 A1    Apr. 21, 2016

(30) Foreign Application Priority Data

Oct. 20, 2014   (JP) ................ 2014-213579

(51) Int. Cl.
*B29C 33/54* (2006.01)
*B22F 3/105* (2006.01)
(Continued)

(52) U.S. Cl.
CPC .......... *B22F 3/1055* (2013.01); *B23K 26/082* (2015.10); *B23K 26/125* (2013.01); *B23K 26/127* (2013.01); *B23K 26/144* (2015.10); *B23K 26/1464* (2013.01); *B23K 26/342* (2015.10); *B23K 26/702* (2015.10); *B29C 67/0077* (2013.01); *B33Y 10/00* (2014.12); *B33Y 30/00* (2014.12); *B22F 2003/1056* (2013.01); *B23K 2203/02* (2013.01)

(58) Field of Classification Search
CPC ..... B29C 64/153; B29C 64/20; B29C 64/205; B29C 64/227; B29C 64/232; B29C 64/255
See application file for complete search history.

(56) References Cited

U.S. PATENT DOCUMENTS 5,647,931 A   7/1997  Retallick et al.
6,672,343 B1  1/2004  Perret et al.
(Continued)

FOREIGN PATENT DOCUMENTS

CN   2060366 U   8/1990
CN   2470032 Y   1/2002
(Continued)

OTHER PUBLICATIONS

German Office Action dated Oct. 30, 2017 in corresponding German application No. 102015116923.1; 15 pgs.
(Continued)

*Primary Examiner* — Joseph S Del Sole
*Assistant Examiner* — Thu Khanh T Nguyen
(74) *Attorney, Agent, or Firm* — Maier & Maier, PLLC

(57) ABSTRACT

A lamination molding apparatus capable of supplying a material powder steadily to a recoater head, is provided. A lamination molding apparatus including a chamber covering a desired molding region and being filled with an inert gas having a desired concentration; a recoater head moving in the chamber to supply a material powder on the molding region to form a material powder layer; and a material supplying unit to supply the material powder to the recoater head; wherein the recoater head includes a material holding section to hold the material powder; and a material discharging opening to discharge the material powder in the material holding section.

8 Claims, 16 Drawing Sheets

(51) Int. Cl.
*B23K 26/144* (2014.01)
*B23K 26/14* (2014.01)
*B33Y 30/00* (2015.01)
*B29C 67/00* (2017.01)
*B33Y 10/00* (2015.01)
*B23K 26/12* (2014.01)
*B23K 26/342* (2014.01)
*B23K 26/70* (2014.01)
*B23K 26/082* (2014.01)
*B23K 103/02* (2006.01)

(56) References Cited

U.S. PATENT DOCUMENTS

| | | | | |
|---|---|---|---|---|
| 2006/0214335 | A1* | 9/2006 | Cox | B29C 64/153 |
| | | | | 264/497 |
| 2009/0206522 | A1 | 8/2009 | Hein et al. | |
| 2012/0202012 | A1 | 8/2012 | Grebe et al. | |
| 2013/0000549 | A1 | 1/2013 | Hartmann | |
| 2015/0283610 | A1* | 10/2015 | Ljungblad | B29C 64/20 |
| | | | | 419/55 |
| 2016/0052165 | A1 | 2/2016 | Hartmann | |
| 2016/0052166 | A1 | 2/2016 | Hartmann | |

FOREIGN PATENT DOCUMENTS

| | | |
|---|---|---|
| CN | 101553355 A | 10/2009 |
| CN | 103662860 A | 3/2014 |
| CN | 203509030 U | 4/2014 |
| DE | 4400523 A1 | 7/1995 |
| DE | 102010013732 A1 | 10/2011 |
| DE | 102011003610 A1 | 8/2012 |
| DE | 102012008664 A1 | 11/2013 |
| JP | 08-502703 A | 7/1995 |
| JP | 2003-502500 A | 12/2000 |
| JP | 2001-354324 A | 12/2001 |
| JP | 2007-215495 A | 8/2007 |
| JP | 2007-216595 A | 8/2007 |
| JP | 2011-026668 A | 2/2011 |
| JP | 2014-122042 A | 7/2014 |

OTHER PUBLICATIONS

Japanese Office Action from corresponding Japanese Application No. 2014-213579 dated Jul. 7, 2015; 9 pgs.
Office Action dated May 9, 2017 of corresponding Chinese application No. 201510646413.1; 13 pgs.
Chinese Office Action dated May 23, 2018, in connection with corresponding CN Application No. 201510656413.1 (16 pgs., including English translation).

* cited by examiner

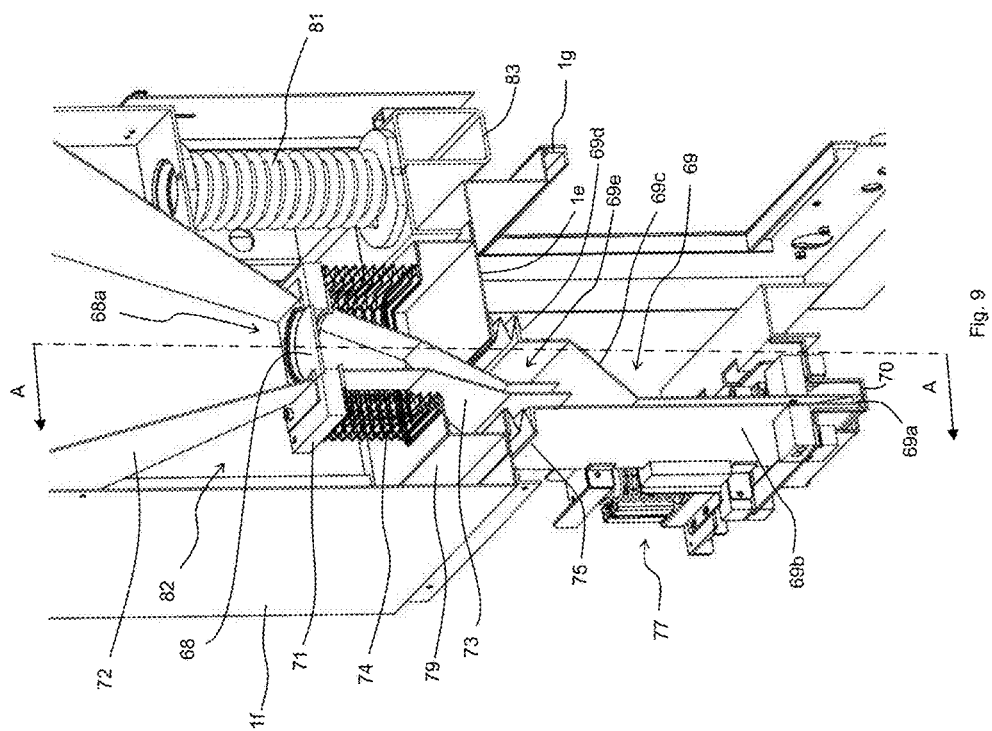

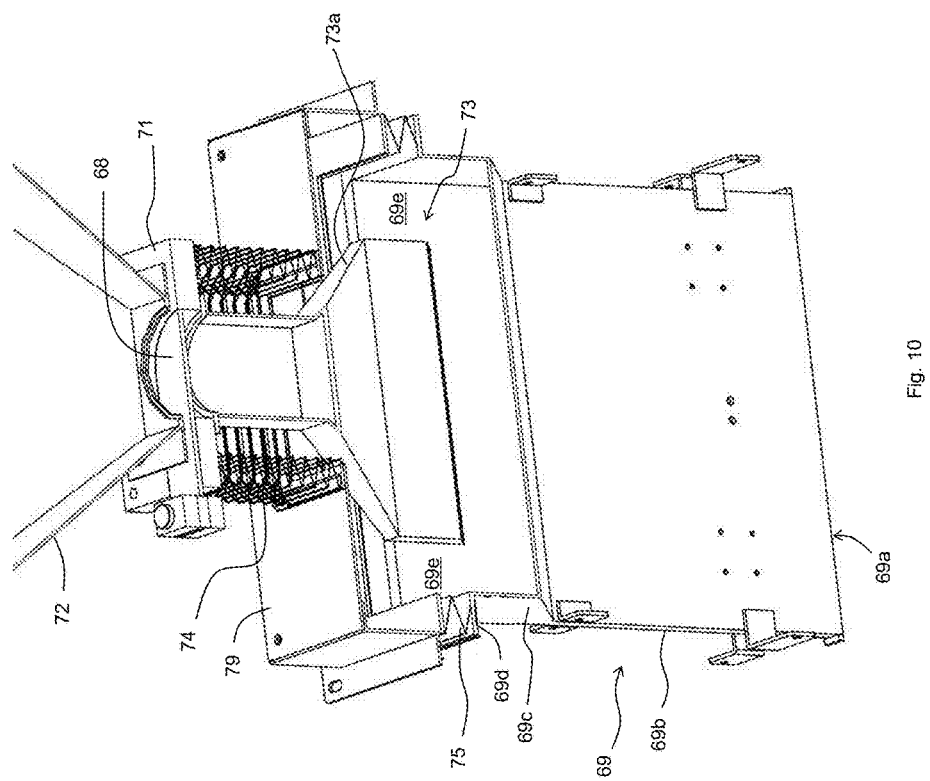

THREE DIMENSIONAL PRINTER

FIELD

Embodiments of the present invention relate to a lamination molding apparatus.

BACKGROUND

In a lamination molding method of metal using laser beam, a molding table capable of vertical movement is arranged in a molding room filled with nitrogen gas. Then, a very thin material powder layer is formed on the molding table. Subsequently, predetermined portions of this material powder layer are irradiated with the laser beam to sinter the material powder at the position of irradiation. These procedures are repeated to form a desired molded product.

In Patent Literature 1, a constitution for supplying a material powder in a region between a pair of blades while moving the supplying opening of the powder supplying apparatus along the longitudinal direction of the pair of blades, is disclosed.

PATENT LITERATURE

[Patent Literature 1] JP 2007-216595A

SUMMARY

The constitution of Patent Literature 1 is superior in that material powder can be easily supplied uniformly or so as to conform with the width of the predetermined molding region in the longitudinal direction between the pair of blades. However, since the material powder is directly supplied onto the region between the pair of blades while moving the supplying opening along the longitudinal direction of the pair of blades, a flexible member such as a hose need be provided in between the supplying opening and the material retaining section fixed above the supplying opening in order to introduce the material powder onto the afore-mentioned region. Here, when the inner diameter of the flexible member is too large, the material powder would be filled in the flexible member, and thus the flexible member cannot be bent. Accordingly, the supplying opening cannot be moved smoothly. Therefore, the inner diameter of the flexible member and the inner diameter of the supplying opening need be made sufficiently small. When the inner diameters are as such, the amount of the material powder being supplied per unit time would be small, and thus the supplying opening need be moved slowly. This would also require the feed rate of the blade be slow. Accordingly, extra time is required to level the material powder. In addition, since the inner diameter of the flexible member is small, the material powder tends to get clogged in the flexible member or in the supplying opening, resulting in cases where the supply of the material is terminated. Further, since the material powder is sent to the supplying opening by free fall, the amount of the material powder being supplied would alter depending on the amount of remaining material powder in the material retaining section, and thus it is difficult to maintain the amount of the material powder being supplied constant. Therefore, the moving speed of the supplying opening need be adjusted in accordance with the amount of the material powder being supplied. However, in reality, it is difficult to control the movement of the supplying opening in such way. Accordingly, the supplying opening is moved in a condition where the amount of the material powder being supplied is not stable. This would result in uneven supply of the material powder within the region, and the material powder would not be supplied evenly with accuracy. Further, there may be a case where the material powder is spilled outside of the region.

The present invention has been made by taking these circumstances into consideration. An object of the present invention is to provide a lamination molding apparatus which can supply the material powder steadily to the recoater head.

According to the exemplary embodiments of the present invention, a lamination molding apparatus comprising: a chamber covering a desired molding region and being filled with an inert gas having a desired concentration; a recoater head moving in the chamber to supply a material powder on the molding region to form a material powder layer; and a material supplying unit to supply the material powder to the recoater head; wherein the recoater head comprises: a material holding section to hold the material powder; and a material discharging opening to discharge the material powder in the material holding section; the material supplying unit comprises: an intermediate duct to supply the material powder to the material holding section; and a main duct to supply the intermediate duct with the material powder; the intermediate duct is configured so as to be capable to discharge the material powder from an intermediate duct outlet capable of vertical movement and having an elongated shape; and the material supplying unit is controlled so as to discharge the material powder from the intermediate duct outlet in a condition where the intermediate duct is moved so that the intermediate duct outlet is located at a position lower than the upper end of the material holding section.

In the lamination molding apparatus of exemplary embodiments of the present invention, the material powder is discharged from the intermediate duct outlet having an elongated shape, thereby supplying the material powder to the recoater head. Accordingly, the intermediate duct need not be moved along the longitudinal direction of the recoater head, allowing simple constitution. In addition, the intermediate duct is capable of moving in vertical direction, and thus the material powder is discharged from the intermediate duct outlet in a condition where the intermediate duct outlet is positioned at a position lower than the upper end of the material holding section of the recoater head. Accordingly, the material powder would not overflow from the material holding section.

Hereinafter, various embodiments of the present invention will be provided. The embodiments provided below can be combined with each other.

Preferably, the material discharging opening has an elongated shape; and the intermediate duct outlet elongates in a direction substantially the same as the material discharging opening.

Preferably, the lamination molding apparatus further comprises: an intermediate duct shutter to open and shut the intermediate duct outlet; wherein: the intermediate duct shutter is controlled so that the intermediate duct outlet is opened in a condition where the intermediate duct outlet is located at a position lower than an upper end of the material holding section.

Preferably, the intermediate duct shutter is structured with at least two shutters capable of being controlled independently from each other.

Preferably, the intermediate duct comprises: a channel section elongating for a predetermined length from the intermediate duct outlet and having a constant cross-sectional area; and a widened section provided at an upper side of the channel section and having a wider cross-sectional area than the channel section.

Preferably, the main duct comprises: a main duct lower section and a main duct upper section provided above the main duct lower section; the material powder supplied to the main duct upper section is supplied to the intermediate duct via the main duct lower section; and a main duct shutter to open and shut a passage in between the main duct lower section and the main duct upper section is provided.

Preferably, the main duct lower section comprises an expanding section, length of the expanding section in a longitudinal direction of the intermediate duct becoming longer as the expanding section comes closer to the intermediate duct.

Preferably, the main duct is configured to be capable of moving vertically in accordance with a weight of the material powder maintained in the main duct.

BRIEF DESCRIPTION OF THE DRAWINGS

The above further objects, features and advantages of the present invention will become more apparent from the following detailed description taken in conjunction with the accompanying drawings, wherein:

FIG. 9 is a perspective view of a cross-section passing through the approximate center in the longitudinal direction of the intermediate duct 69 of FIG. 8.

FIG. 10 is a perspective view of a cross-section passing through the A-A line of FIG. 9 and being parallel with the wall surface structuring the channel section 69b.

DETAILED DESCRIPTION

Hereinafter, the embodiments of the present invention will be described with reference to the drawings. Here, the characteristic matters shown in the embodiments can be combined with each other.

Figure 1:
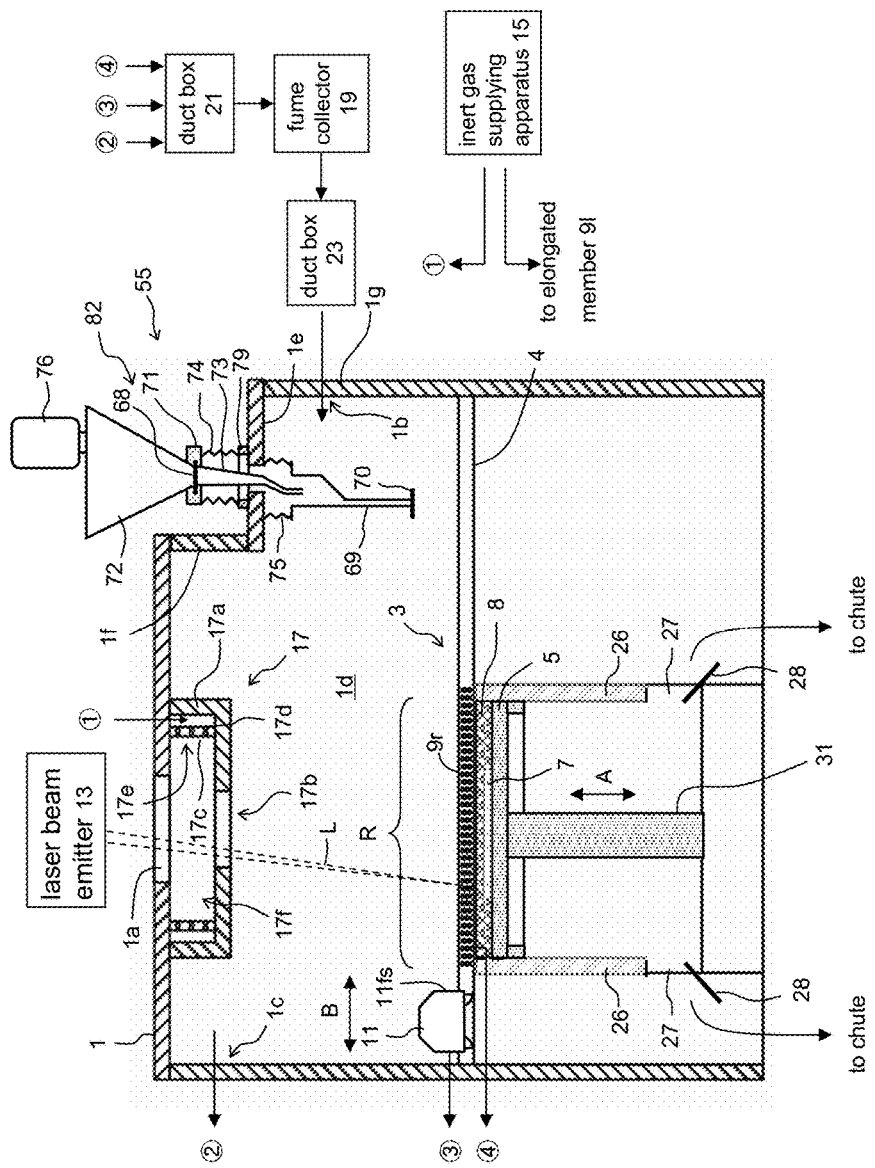
FIG. 1 is a rough structural diagram of the lamination molding apparatus according to an embodiment of the present invention.

As shown in FIG. 1, the lamination molding apparatus according to one embodiment of the present invention comprises a chamber 1 covering the desired molding region R and being filled with an inert gas having a desired concentration; a recoater head 11 moving in the chamber 1 and forming a material powder layer 8 by supplying the material powder on the molding region R; a laser beam emitter 13 which irradiates predetermined portions of the material powder layer 8 with a laser beam L to sinter the material powder at the position of irradiation; and a material supplying unit 55 to supply the material powder to the recoater head 11.

Inside the chamber 1, a powder layer forming apparatus 3 is provided. The powder layer forming apparatus 3 comprises a base stage 4 having the molding region R; a recoater head 11 provided on the base stage 4 and structured so as to be capable of moving in a horizontal uniaxial direction (direction shown by arrow B); and elongated members 9r, 9l provided on both sides of the molding region R along the moving direction of the recoater head 11. The molding region R is further provided with a molding table 5 capable of moving in a vertical direction (direction shown by arrow A in FIG. 1). Here, the molding table 5 is driven by a driving mechanism 31. When the lamination molding apparatus is used, a molding plate 7 is placed on the molding table 5, and the material powder layer 8 is formed on the molding table 5.

The powder retaining wall 26 is provided so as to surround the molding table 5, and the non-sintered material powder is retained in the powder retaining space surrounded by the powder retaining wall 26 and the molding table 5. In the lower side of the powder retaining wall 26, the powder discharging section 27 capable of discharging the material powder in the powder retaining space is provided. After completion of the lamination molding, the molding table 5 is descended so as to discharge the non-sintered material powder from the powder discharging section 27. The material powder discharged is guided to the chute (not shown) by the chute guide 28, and then the material powder is retained in the bucket (not shown) via the chute.

Figure 2:
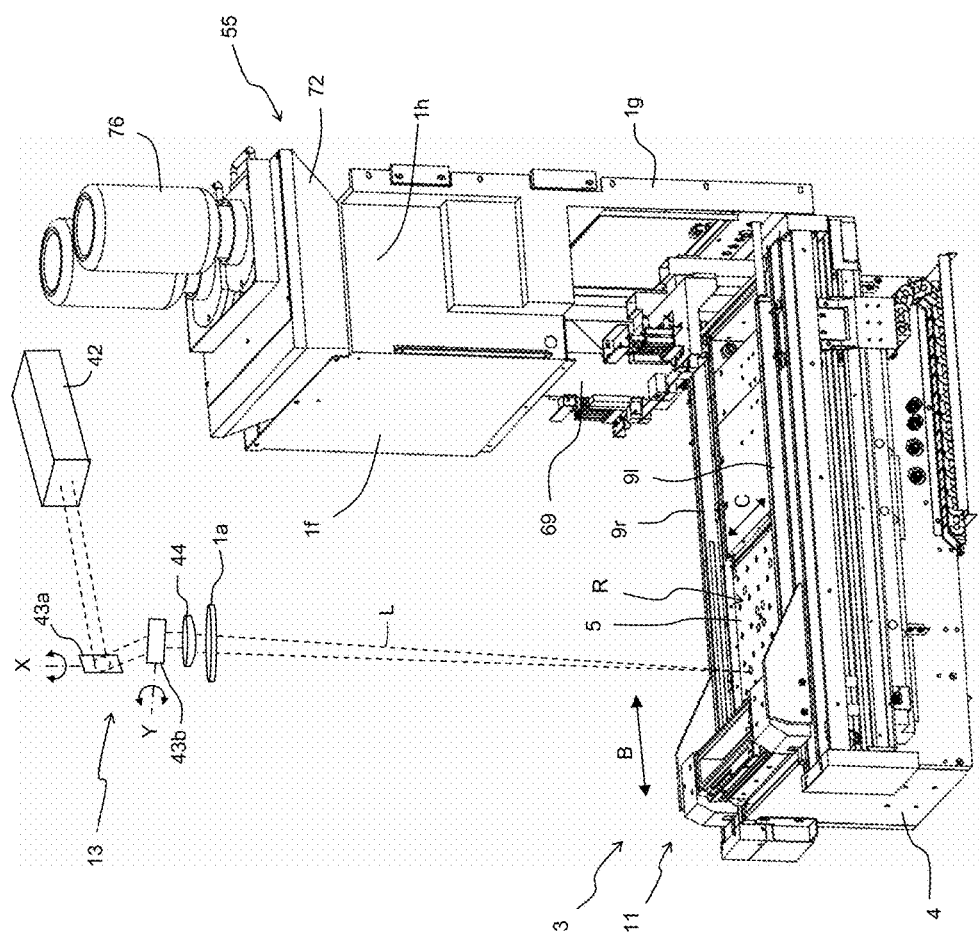
FIG. 2 is a perspective view of the powder layer forming apparatus 3, the material supplying unit 55, and the laser beam emitter 13.
Figure 3:
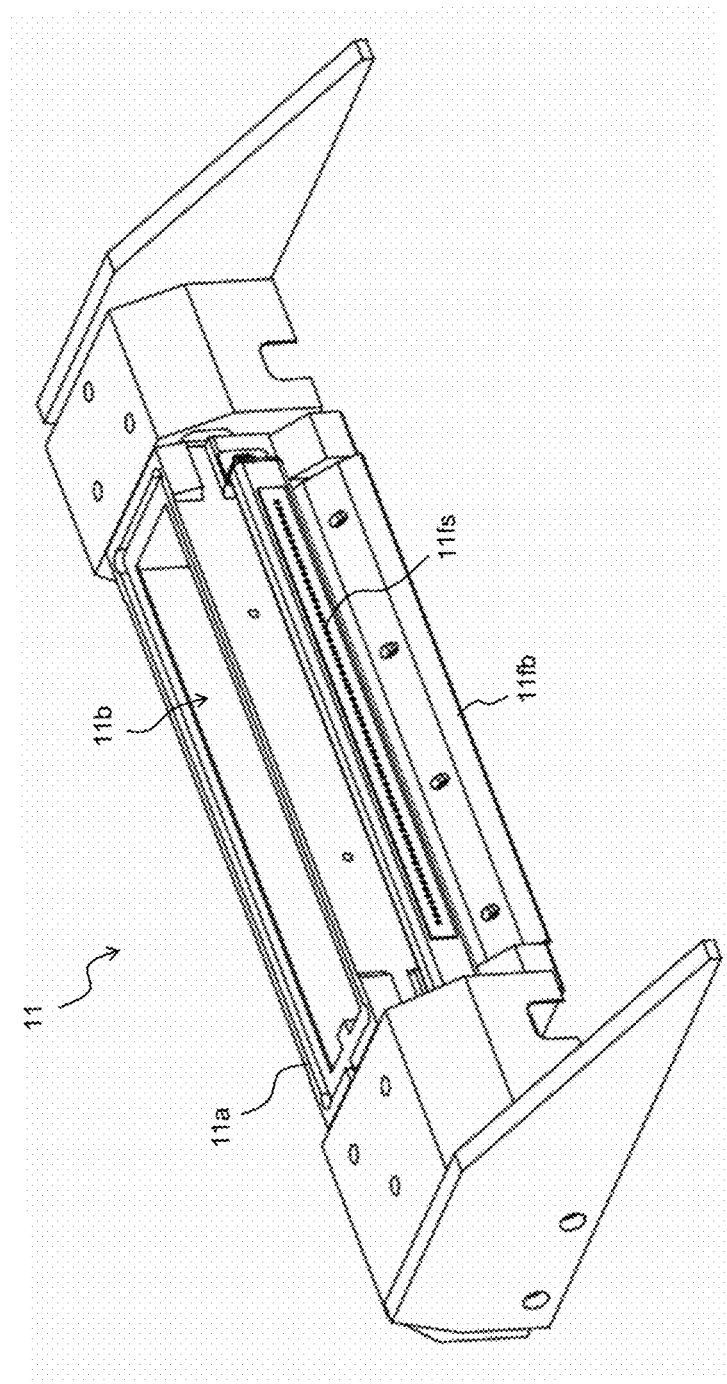
FIG. 3 is a perspective view of the recoater head 11.
Figure 4:
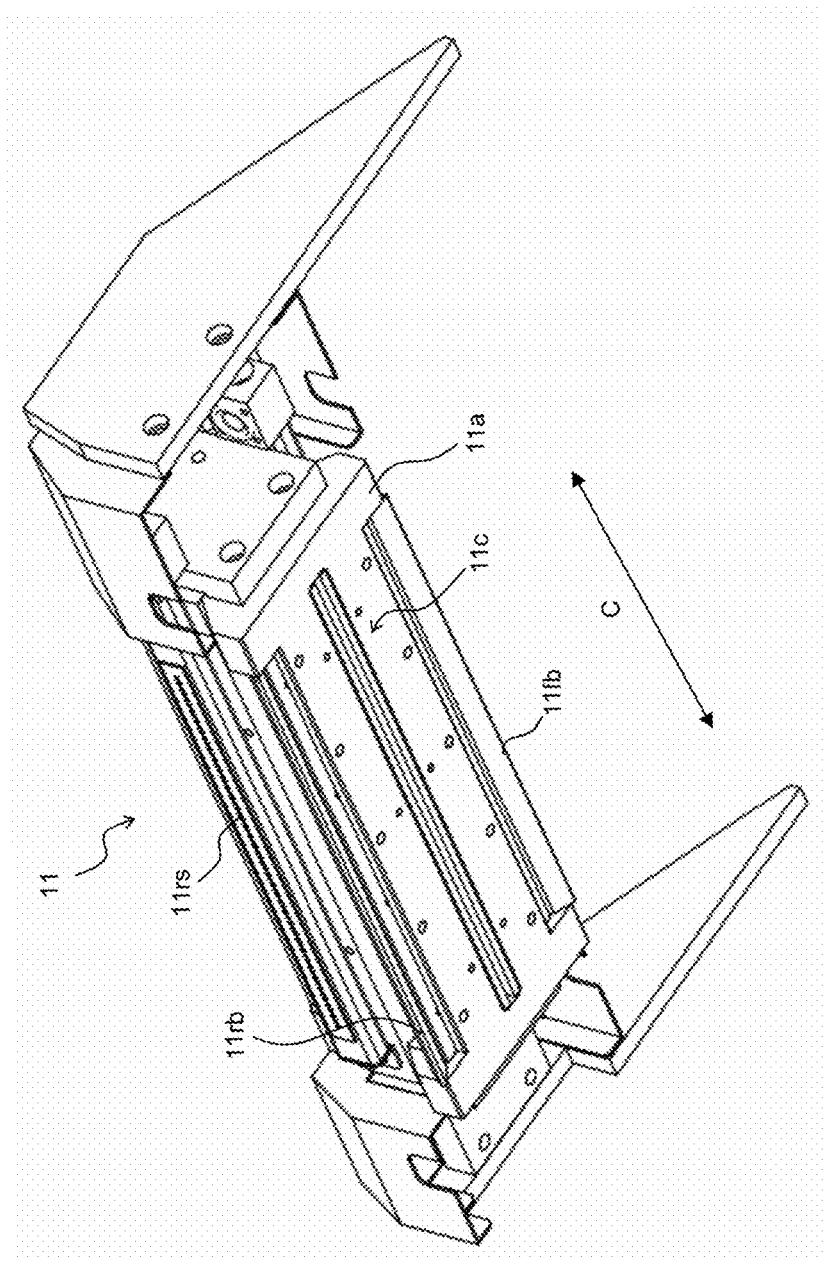
FIG. 4 is a perspective view of the recoater head 11 observed from another angle.

As shown in FIGS. 2 to 4, the recoater head 11 comprises a material holding section 11a, an upper surface opening section 11b provided at the upper surface of the material holding section 11a, and a material discharging opening 11c provided at the bottom surface of the material holding section 11a, the material discharging opening 11c discharging the material powder in the material holding section 11a. The material discharging opening 11c has an elongated slit shape which elongates in the horizontal uniaxial direction (direction shown by arrow C) crossing orthogonally with the moving direction (direction shown by arrow B) of the recoater head 11. On both sides of the recoater head 11, squeegee blades 11fb and 11rb for forming a material powder layer 8 by planarizing the material powder discharged from the material discharging section 11c are provided. In addition, on both sides of the recoater head 11, fume suction sections 11fs and 11rs for suctioning the fume generated during sintering of the material powder are provided. The fume suction sections 11*fs* and 11*rs* are provided along the horizontal uniaxial direction (direction shown by arrow C) crossing orthogonally with the moving direction (direction shown by arrow B) of the recoater head 11. The material powder is, for example, metal powder (iron powder for example) having a sphere shape with an average particle diameter of 20 μm.

The elongated members 9*r* and 9*l* are provided with openings along the moving direction (direction shown by arrow B) of the recoater head 11. One of the openings is used as the inert gas supplying opening, and the other opening is used as the inert gas discharging opening. Accordingly, a flow of inert gas can be made in the direction shown by the arrow C on the molding region R. Therefore, the fume generated in the molding region R can be easily discharged along this flow of the inert gas. Here, in the present specification, "inert gas" is a gas which substantially does not react with the material powder, and nitrogen gas, argon gas, and helium gas can be mentioned for example.

A laser beam emitter 13 is provided above the chamber 1. As shown in FIG. 2, the laser beam emitter 13 comprises a laser source 42 to emit the laser beam L, a pair of galvanometer scanners 43*a* and 43*b* to perform two dimensional scanning of the laser beam L emitted from the laser source 42, and a condensing lens 44 to condense the laser beam L. The galvanometer scanner (X-axis scanner) 43*a* scans the laser beam L in the direction shown by arrow B (X-axis direction), and the galvanometer scanner (Y-axis scanner) 43*b* scans the laser beam L in the direction shown by arrow C (Y-axis direction). Each of the scanners 43*a* and 43*b* is controlled of its rotation angle depending on the magnitude of the rotation angle controlling signal. Accordingly, the position irradiated by the laser beam L can be moved to a desired position by altering the magnitude of the rotation angle controlling signal being input to the scanners 43*a* and 43*b*. An example of the condensing lens 44 is fθ lens.

The laser beam L which passed through the condensing lens 44 further passes through the window 1*a* provided to the chamber 1. Then, the material powder layer 8 formed in the molding region R is irradiated with the laser beam L. The type of the laser beam L is not limited so long as it can sinter the material powder. For example, $CO_2$ laser, fiber laser, YAG laser and the like can be used. The window 1*a* is formed with a material capable of transmitting the laser beam L. For example, in a case where the laser beam L is fiber laser or YAG laser, the window 1*a* can be structured with a quartz glass.

On the upper surface of the chamber 1, the fume adhesion preventing section 17 is provided so as to cover the window 1*a*. The fume adhesion preventing section 17 is provided with a cylindrical housing 17*a* and a cylindrical diffusing member 17*c* arranged in the housing 17*a*. An inert gas supplying space 17*d* is provided in between the housing 17*a* and the diffusing member 17*c*. Further, on the bottom surface of the housing 17*a*, an opening 17*b* is provided at the inner portion of the diffusing member 17*c*. The diffusing member 17*c* is provided with a plurality of pores 17*e*, and the clean inert gas supplied into the inert gas supplying space 17*d* is filled into a clean space 17*f* through the pores 17*e*. Then, the clean inert gas filled in the clean space 17*f* is discharged towards below the fume adhesion preventing section 17 through the opening 17*b*.

As shown in FIGS. 1 and 2, the material supplying unit 55 is provided at a position in the vicinity of the wall surfaces 1*e*, 1*f*, 1*g*, and 1*h*. The material supplying unit 55 comprises an intermediate duct 69 to supply the material powder to the material holding section 11*a* of the recoater head 11; and a main duct 82 to supply the material powder to the intermediate duct 69. The material powder in the main duct 82 is supplied from the material tank 76. The main duct 82 comprises a main duct lower section 73, and a main duct upper section 72 provided above the main duct lower section 73. Here, constitution is made so that the material powder supplied to the main duct upper section 72 is supplied to the intermediate duct 69 via the main duct lower section 73.

Figure 5:
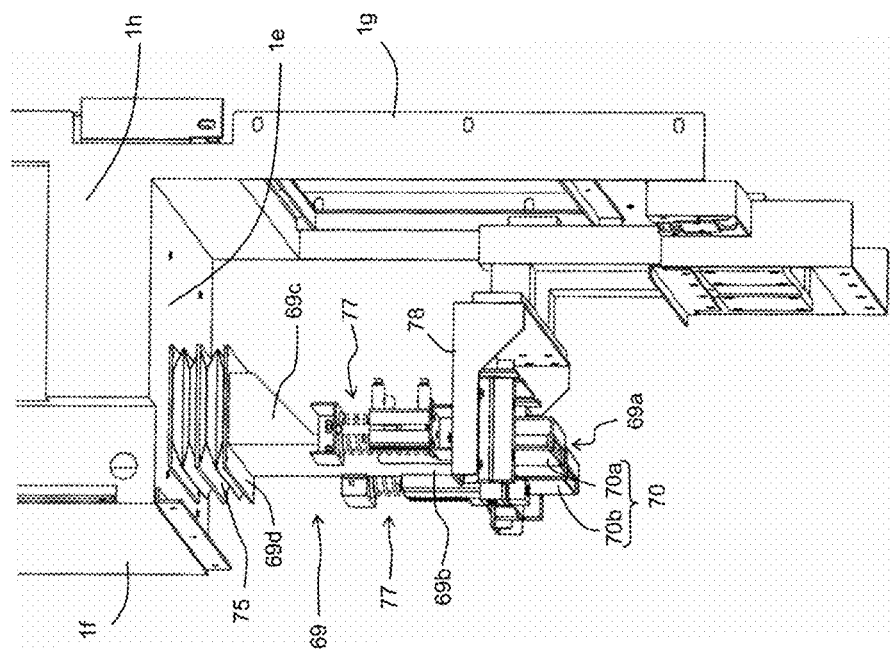
FIG. 5 is a perspective view of the constitution of the intermediate duct 69 and its vicinity, taken out from FIG. 2.

As shown in FIG. 5, the intermediate duct 69 is structured so that the material powder is discharged from the intermediate duct outlet 69*a* which is capable of moving in a vertical direction and has an elongated shape (rectangular shape in the present embodiment). The intermediate duct outlet 69*a* elongates in the direction substantially the same as the material discharging opening 11*c* of the recoater head 11. With such structure, the material powder being discharged from the intermediate duct outlet 69*a* can be discharged substantially even in the elongation direction of the material discharging opening 11*c*. Accordingly, it is advantageous since the intermediate duct 69 need not be moved in the longitudinal direction of the recoater head 11.

Figure 6:
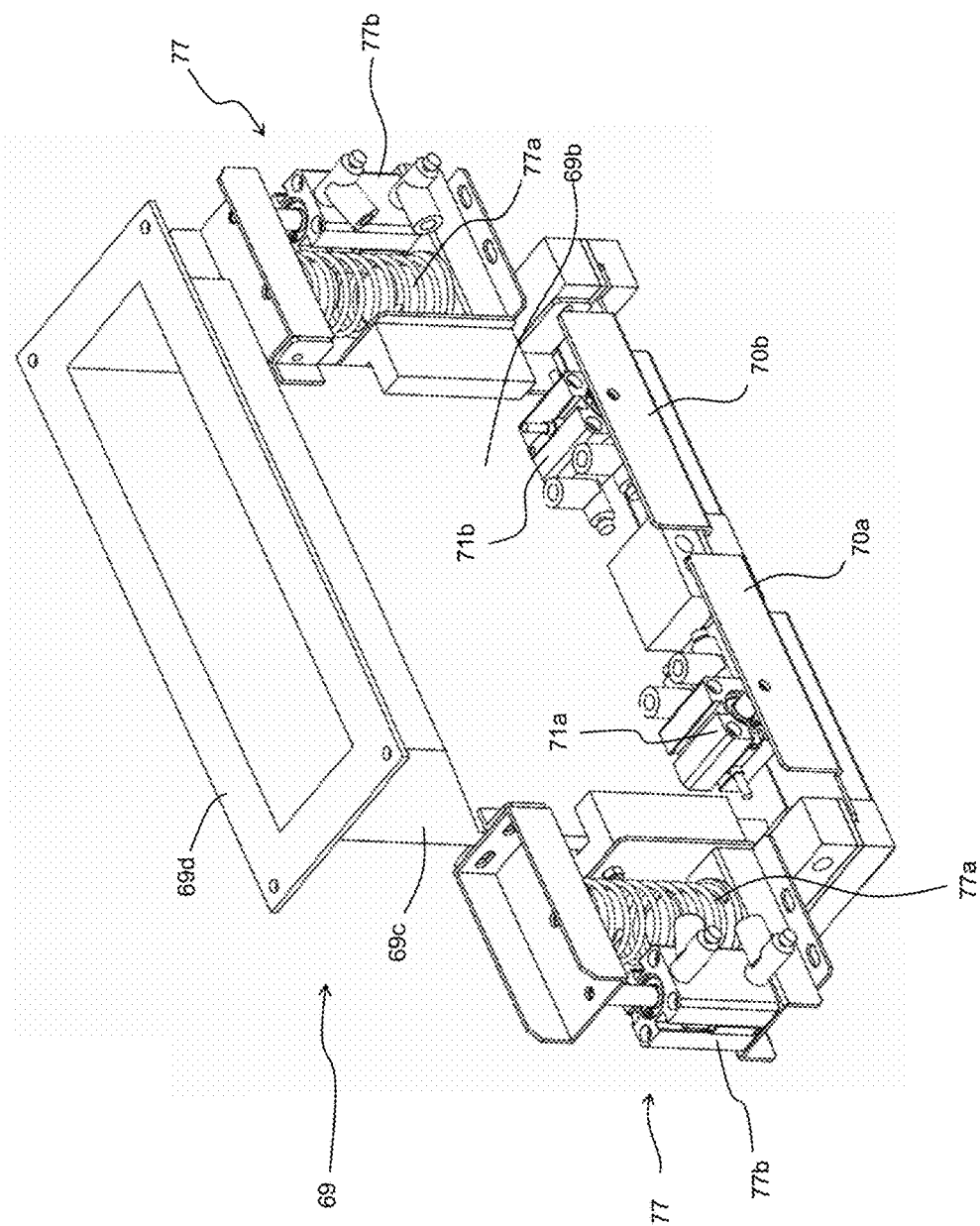
FIG. 6 is a perspective view of the constitution of the intermediate duct 69 and its driving mechanism, taken out from FIG. 5.

The intermediate duct outlet 69*a* is opened and shut by one or more intermediate duct shutter 70. In the present embodiment, two intermediate duct shutters 70*a* and 70*b* which can be controlled independently from each other, are provided. As shown in FIG. 6, the intermediate shutters 70*a* and 70*b* are each driven by cylinders 71*a* and 71*b*, respectively. The intermediate duct shutters 70*a* and 70*b* are each provided with openings 70*a*1 and 70*b*1 at a bottom surface of the intermediate duct shutters 70*a* and 70*b*, respectively. Here, the intermediate duct shutters 70*a* and 70*b* are moved so that the position of the openings 70*a*1 and 70*b*1 match with the position of the intermediate duct outlet 69*a*. Accordingly, the material powder can be discharged from the intermediate duct 69. Here, in FIG. 7, the position of the opening 70*a*1 of the intermediate duct shutter 70*a* is matched with the position of the intermediate duct outlet 69*a*, and the position of the opening 70*b*1 of the intermediate duct shutter 70*b* is not matched with the position of the intermediate duct outlet 69*a*. Accordingly, the material powder is discharged only from the intermediate shutter 70*a* side. As described, by providing a plurality of shutters which can be driven independently from each other, the powder material can be discharged from a partial region of the intermediate duct outlet 69*a*. When the material powder is discharged in such way, the material powder layer 8 can be formed only on a partial region of the molding region R, allowing to reduce the amount of material powder used when the size of the molded product is relatively small. The intermediate duct outlet 69*a* is usually shut by the intermediate shutter 70, and is opened at a position lower than the upper end of the material holding section 11*a* when the material powder is supplied to the material holding section 11*a* of the recoater head 11, from the intermediate duct outlet 69*a*. Here, when two or more of the intermediate shutters 70 are opened and shut independently from each other, it is preferable to provide a plurality of sensors to detect the amount of the material powder in the material holding section 11*a* in accordance with the position of each of the intermediate duct shutters 70, as described later.

Figure 7:
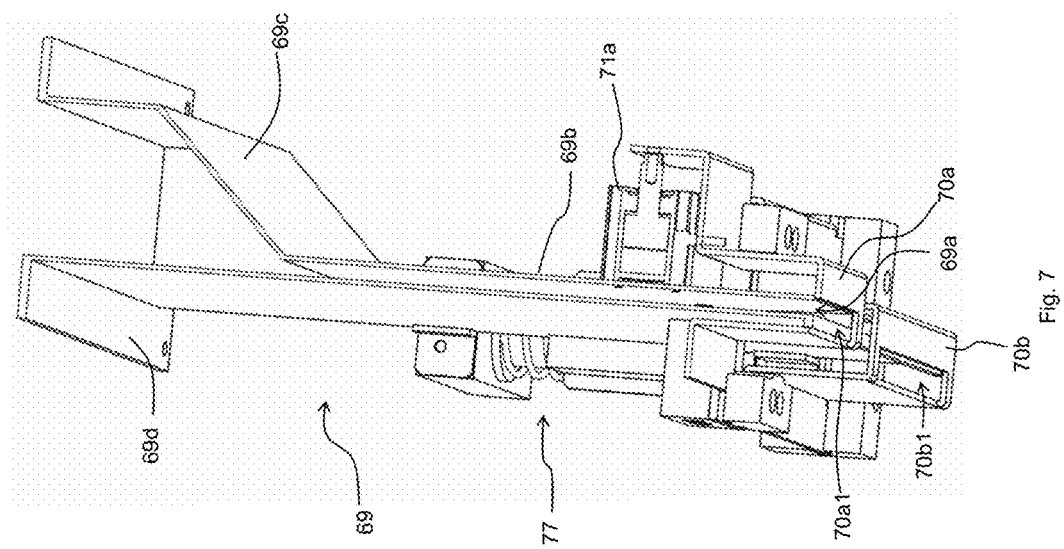
FIG. 7 is a perspective view of a cross-section passing through the cylinder 71a of FIG. 6.

As shown in FIGS. 5 to 7, the intermediate duct 69 comprises a channel section 69*b* elongating for a predetermined length from the intermediate duct outlet 69*a* and having a constant cross-sectional area; and a widened section 69*c* provided at the upper side of the channel section 69*b* and having a wider cross-sectional area than the channel section 69*b*. Here, the cross-sectional area is an area of a cross-section parallel with a horizontal plane. The material powder supplied from the main duct 82 passes through the widened section 69c and is then supplied to the channel section 69b. The channel section 69b is provided in between a pair of wall surfaces arranged with a gap. Since the cross-sectional area of the channel section 69b is small, the material powder can easily be filled, while the material powder is also easily clogged in the channel section 69b. However, the vibration caused by the vertical movement of the intermediate duct 69 allows to solve the clogging of the material powder in the channel section 69b.

A flange 69d is provided at an upper end of the intermediate duct 69. Here, one end of the bellows 75 is fixed with the flange 69d, and the other end of the bellows 75 is fixed with the wall surface 1e. When the intermediate duct 69 moves vertically, the bellows 75 expands and contracts so as to maintain connection between the intermediate duct 69 and the wall surface 1e. As shown in FIGS. 2, 5, and 6, the intermediate duct 69 is capable of moving vertically by means of a driving mechanism 77 provided on a supporting table 78 fixed on the base stage 4 forming the molding region R. The driving mechanism 77 is structured with a coil spring 77a and a cylinder 77b, and the intermediate duct 69 moves vertically in accordance with the expansion and contraction of the cylinder 77b.

Figure 8:
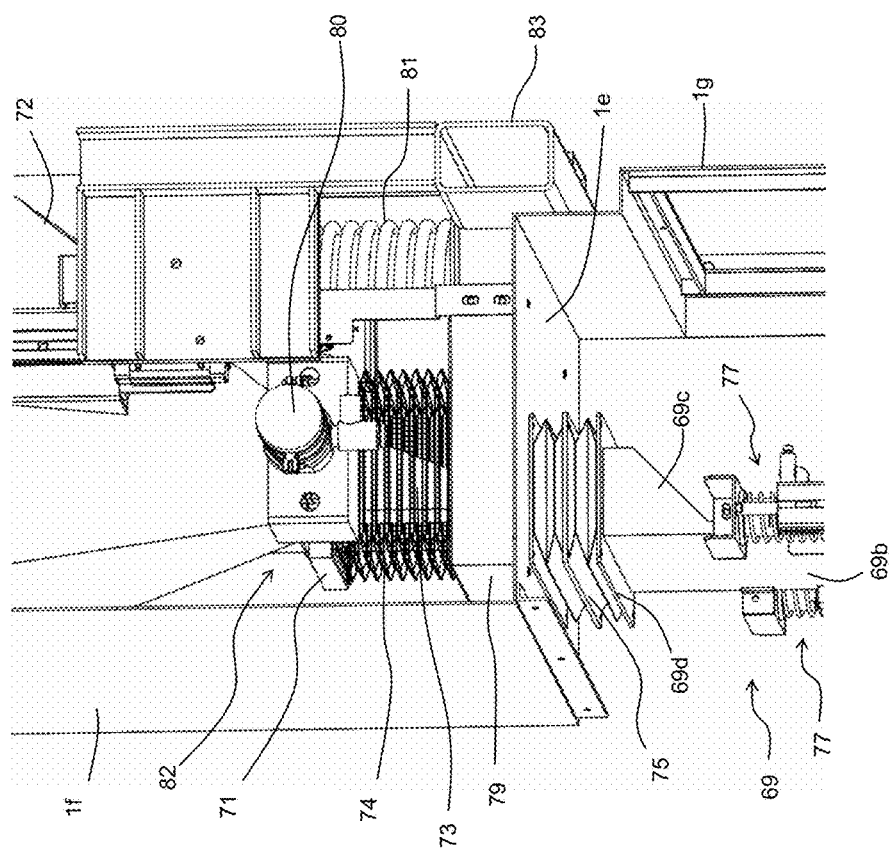
FIG. 8 is a perspective view of the vicinity of the connecting section of the intermediate duct 69 and the main duct 82, taken out from FIG. 2, in a condition where the wall surface 1h is removed.

As shown in FIGS. 8 to 9, a cover 79 is provided on the wall surface 1e. Here, the main duct lower section 73 is inserted in the opening provided on the wall surface 1e and the cover 79. The outlet at the end of the main duct lower section 73 is arranged in the intermediate duct 69, and thus the material powder from the main duct lower section 73 is supplied to the intermediate duct 69. As shown in FIG. 10, the main duct lower section 73 is provided with an expanding section 73a, of which length in the longitudinal direction of the intermediate duct 69 becomes longer as the expanding section 73a comes closer to the intermediate duct 69. Accordingly, the material powder is supplied to the intermediate duct 69 while expanding in the longitudinal direction of the intermediate duct 69, and the material powder is also less likely to get clogged in the main duct lower section 73. In addition, in the space 69e above the end of the main duct lower section 73 within the intermediate duct 69, the material powder would not be filled, and tends to form an air entrapment. Therefore, the space 69e is less likely to get clogged with the material powder.

In between the main duct lower section 73 and the main duct upper section 72, a main duct shutter 68 to open and shut a passage 68a in between the main duct lower section 73 and the main duct upper section 72 is provided. The main duct shutter 68 is supported by a shutter support 71. The shutter support 71 is provided with a cylinder 80 to open and shut the main duct shutter 68, and the main duct shutter 68 moves in accordance with the expansion and contraction of the cylinder 80 to open and shut the passage 68a.

The shutter support 71 and the cover 79 are connected by bellows 74. That is, one end of the bellows 74 is fixed to the shutter support 71, and the other end of the bellows 74 is fixed to the cover 79. The main duct 82 is supported by a coil spring 81 arranged on a supporting table 83, and is structured so as to be capable of moving vertically in accordance with the weight of the material powder maintained in the main duct 82. With such constitution, the main duct 82 is raised as the amount of material powder becomes less, and the timing for supplying the main duct 82 with the material powder can be detected easily. In addition, when the main duct 82 moves vertically, the bellows 74 expands and contracts so as to maintain the connection in between the shutter support 71 and the cover 79.

The inside and outside of the chamber 1 is separated by the main duct shutter 68, the shutter support 71, the bellows 74, the cover 79, and the bellows 75. The space surrounded by these members serves as the space inside the chamber 1, and is maintained under inert gas atmosphere during the lamination molding. On the other hand, the space outside of the bellows 74 and the space above the main duct shutter 68 are maintained under external atmosphere. Regarding the main duct 82, the inside of the main duct upper section 72 serves as the outer space, and the inside of the main duct lower section 73 serves as the inside the chamber 1. These spaces are separated by the main duct shutter 68. The passage 68a is usually shut by the main duct shutter 68, and is opened when the material powder is supplied from the main duct upper section 72 to the main duct lower section 73. With such structure, the amount of outer air entering the chamber 1 when the material powder 1 is supplied to the recoater head 11 during lamination molding can be minimized.

Next, the inert gas supplying system to supply the inert gas to the chamber 1 and the fume discharging system to discharge the fume from the chamber 1 are explained.

The inert gas supplying system to supply the inert gas into the chamber 1 is connected with an inert gas supplying apparatus 15 and a fume collector 19. The inert gas supplying apparatus 15 has a function to supply the inert gas, and is a gas cylinder of an inert gas for example. The fume collector 19 comprises duct boxes 21 and 23 provided at its upper stream side and its lower stream side, respectively. The gas (inert gas containing fume) discharged from the chamber 1 is sent to the fume collector 19 through the duct box 21. Then, fume is removed in the fume collector 19, and the cleaned inert gas is sent to the chamber 1 through the duct box 23. According to such constitution, the inert gas can be recycled.

As shown in FIG. 1, the inert gas supplying system is connected with the upper supplying opening 1b of the chamber 1, the inert gas supplying space 17d of the fume adhesion preventing section 17, and the elongated member 91. The inert gas is supplied into the molding space 1d of the chamber 1 through the upper supplying opening 1b. The inert gas supplied into the elongated member 91 is discharged onto the molding region R through the opening.

In the present embodiment, the inert gas from the fume collector 19 is sent to the upper supplying opening 1b, and the inert gas from the inert gas supplying apparatus 15 is supplied to the inert gas supplying space 17d and to the elongated member 91. Although there is a possibility that the inert gas from the fume collector 19 contains residual fume, the constitution of the present embodiment does not permit the inert gas from the fume collector 19 be supplied into the space which requires especially high cleanliness (clean space 17f and the space at the periphery of the molding region R). Accordingly, the effect of the residual fume can be minimized.

As shown in FIG. 1, the fume discharging system to discharge the fume from the chamber 1 is connected with the upper discharging opening 1c of the chamber 1, the fume suction sections 11fs and 11rs of the recoater head 11, and the elongated member 9r. Since the inert gas containing the fume in the molding space 1d of the front chamber 1f is discharged through the upper discharging opening 1c, a flow of inert gas flowing from the upper supplying opening 1b towards the upper discharging opening 1c is formed in the molding space 1d. The fume suction sections 11fs and 11rs of the recoater head 11 can suction the fume generated in the molding region R when the recoater head 11 passes over the molding region R. Here, the inert gas containing the fume is discharged out of the chamber 1 through the opening of the elongated member 9r. The fume discharging system is connected with the fume collector 19 through the duct box 21, and the inert gas after removal of the fume by the fume collector 19 is recycled.

Next, the lamination molding method using the aforementioned lamination molding apparatus will be explained.

Figure 11A:
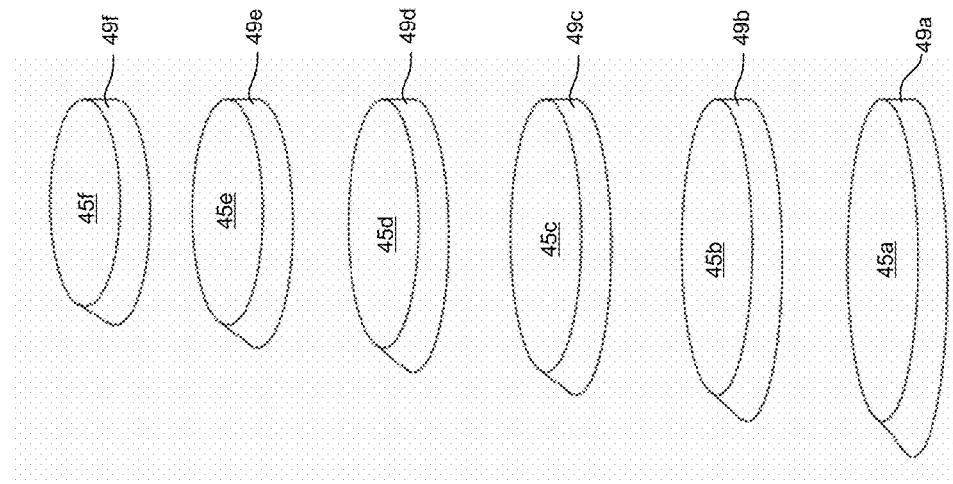
FIG. 11A is a perspective view showing the molded product 47 having the desired profile.

Here, a case where the molded product 47 having the three-dimensional profile as shown in FIG. 11A is formed by lamination molding is taken as an example for the explanation.

Figure 11B:
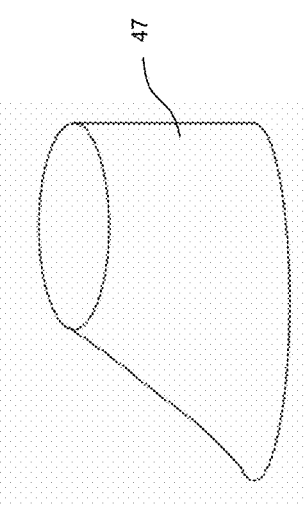
FIG. 11B is a perspective view showing the model of the molded product of FIG. 11A.
Figure 11C:
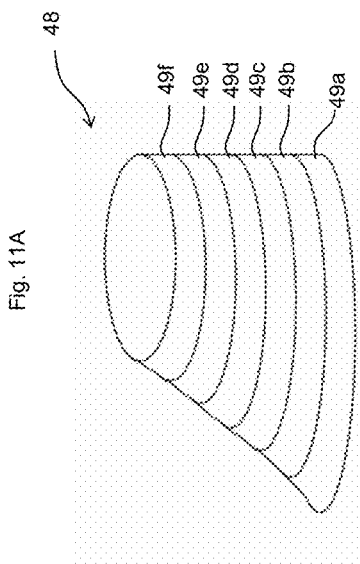
FIG. 11C is a perspective view showing the model of FIG. 11B sliced by a horizontal plane at a predetermined unit height.
Figure 12:
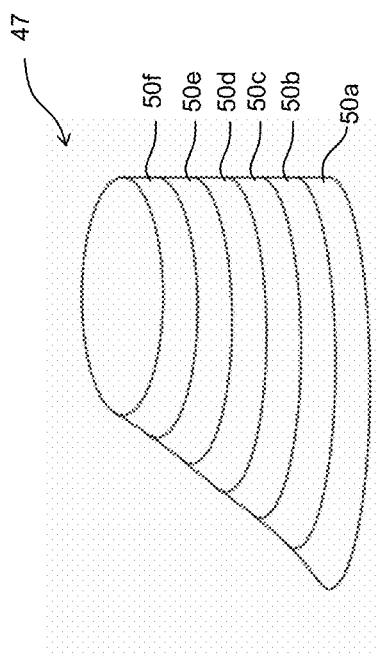
FIG. 12 is a perspective view showing the molded product 47 obtained by laminating the sintered layers 50.

First, as shown in FIGS. 11B to 11C, a molded product 47 having the desired three-dimensional profile is molded using a computer, thereby obtaining a model 48 of the molded product. Then the model 48 of the molded product is sliced by a horizontal plane with a predetermined unit height, thereby forming sliced layers of 49a, 49b, . . . 49f. Subsequently, as shown in FIGS. 11 to 14, the material powder layer 8 is irradiated with the laser beam L so as to selectively sinter the material powder, thereby forming the sintered layers of 50a, 50b, . . . 50f having the profile corresponding to the sliced layers of 49a, 49b, . . . 49f respectively. The sintered layers are also fused with each other, thereby forming the molded product 47. The region surrounded by the outline profile of each of the sliced layers of 49a, 49b, . . . 49f is the region to be irradiated with the laser beam L, f 45a, 45b, . . . 45f (hereinafter referred to as irradiation region). The sliced layers, sintered layers, and irradiation region are also referred to as sliced layers 49, sintered layers 50, and irradiation region 45, respectively.

As described, the molded product 47 can be formed by repeating selective sintering of the material powder of the material powder layer 8 in the irradiation region 45. This is accomplished by irradiating the irradiation region 45 with the laser beam L. Here, the irradiation region 45 is surrounded by the outline profile of each of the sliced layers 49 of the model 48 of the molded product.

Next, the method for forming the sintered layers 50 will be explained in detail.

First, the height of the molding table 5 is adjusted to an adequate position while the molding plate 7 is mounted on the molding table 5. In such condition, the recoater head 11 having the material holding section 11a filled with the material powder is moved from the left side to the right side of the molding region R (in the direction shown by the arrow B in FIG. 1. Accordingly, the first layer of the material powder layer 8 is formed on the molding table 5.

Figure 13:
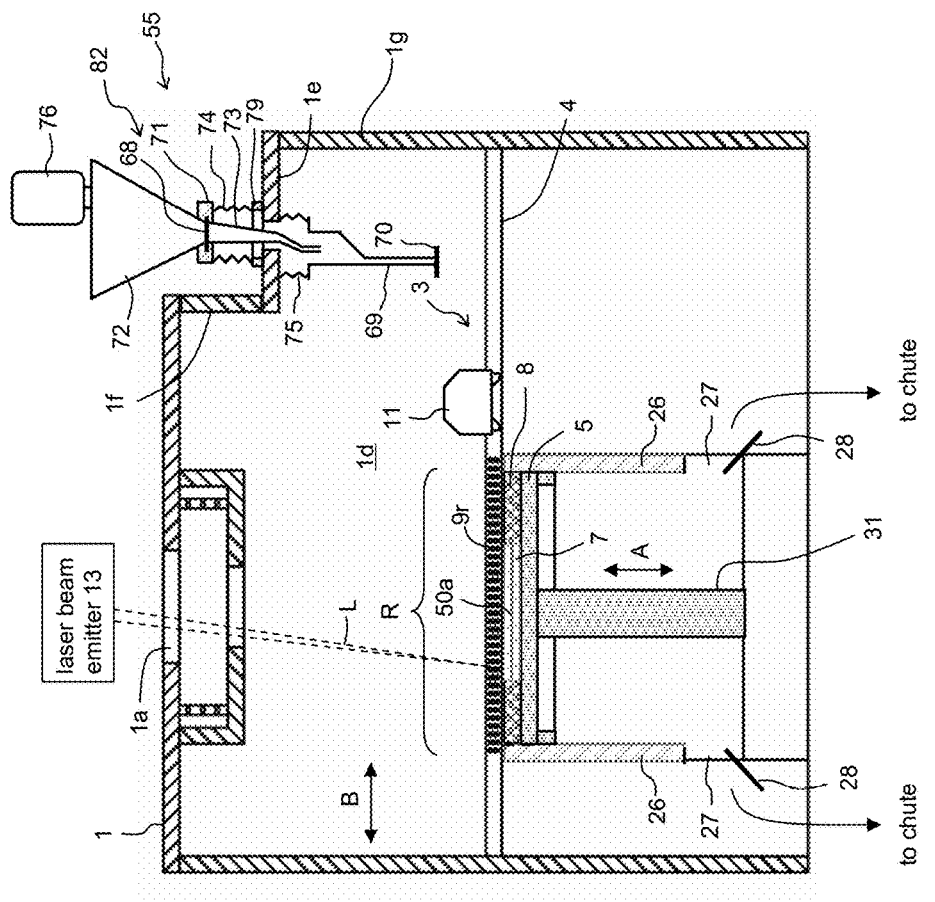
FIG. 13 is an explanatory drawing showing the lamination molding method which uses the lamination molding apparatus according to one embodiment of the present invention.

Subsequently, a prescribed portion of the material powder layer 8 is irradiated with the laser beam L, thereby sintering the portion of the material powder layer 8 irradiated with the laser beam. Accordingly, the first sintered layer 50a is obtained as shown in FIG. 13.

Next, the height of the molding table 5 is descended by the thickness of one layer of the material powder layer 8, followed by moving of the recoater head 11 from the right side to the left side of the molding region R. Accordingly, the second material powder layer 8 is formed so as to cover the sintered layer 50a.

Figure 14:
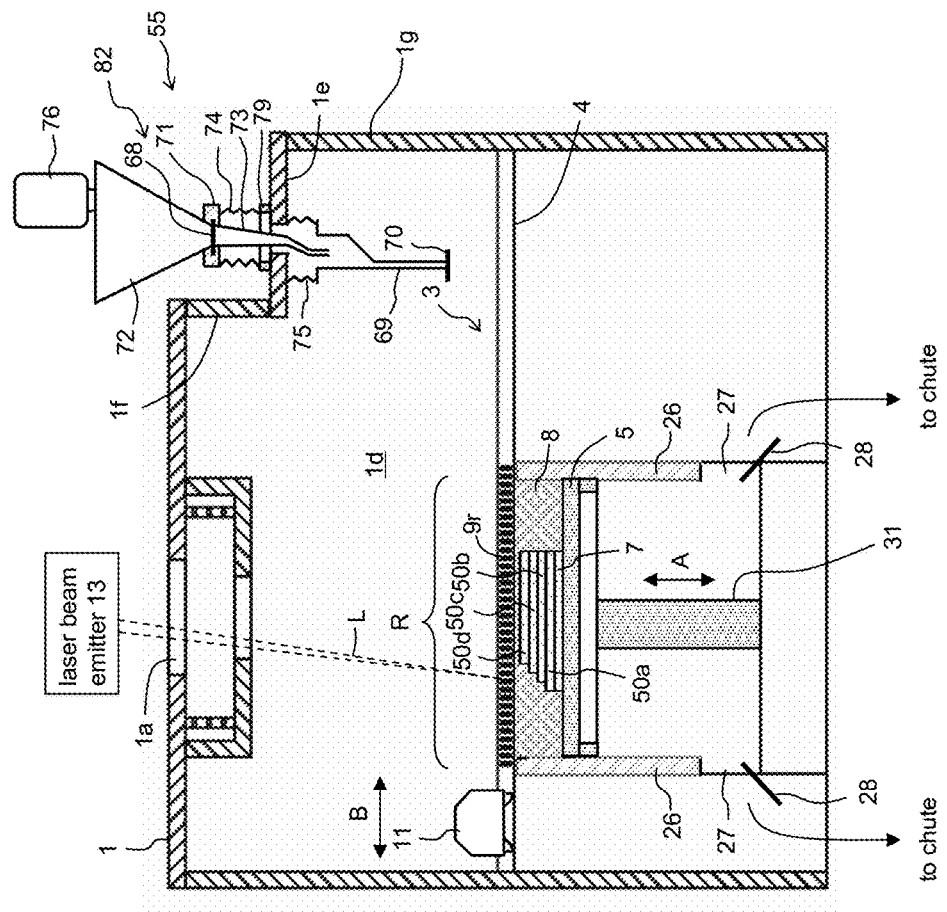
FIG. 14 is an explanatory drawing showing the lamination molding method which uses the lamination molding apparatus according to one embodiment of the present invention.

Subsequently, in a similar manner as described, the prescribed portion of the material powder layer 8 is irradiated with the laser beam L, thereby sintering the portion of the material powder layer 8 irradiated with the laser beam. Accordingly, the second sintered layer 50b is obtained as shown in FIG. 14.

By repeating the afore-mentioned procedures, the third sintered layer 50c, the fourth sintered layer 50d, and the sintered layers thereafter are formed. The neighboring sintered layers are firmly fixed with each other.

After completion of the lamination molding, the non-sintered material powders are discharged via the powder discharging section 27, to give the molded product.

Figure 15:
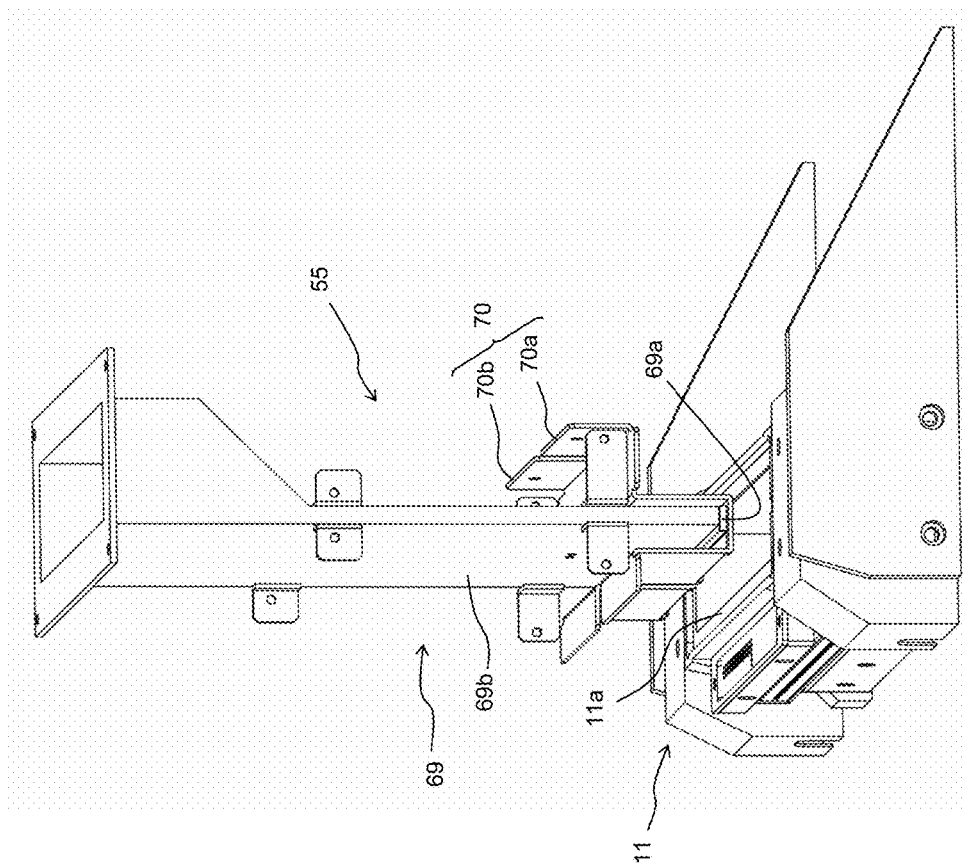
FIG. 15 is a perspective view for explaining the method for filling the material powder into the recoater head 11.
Figure 16:
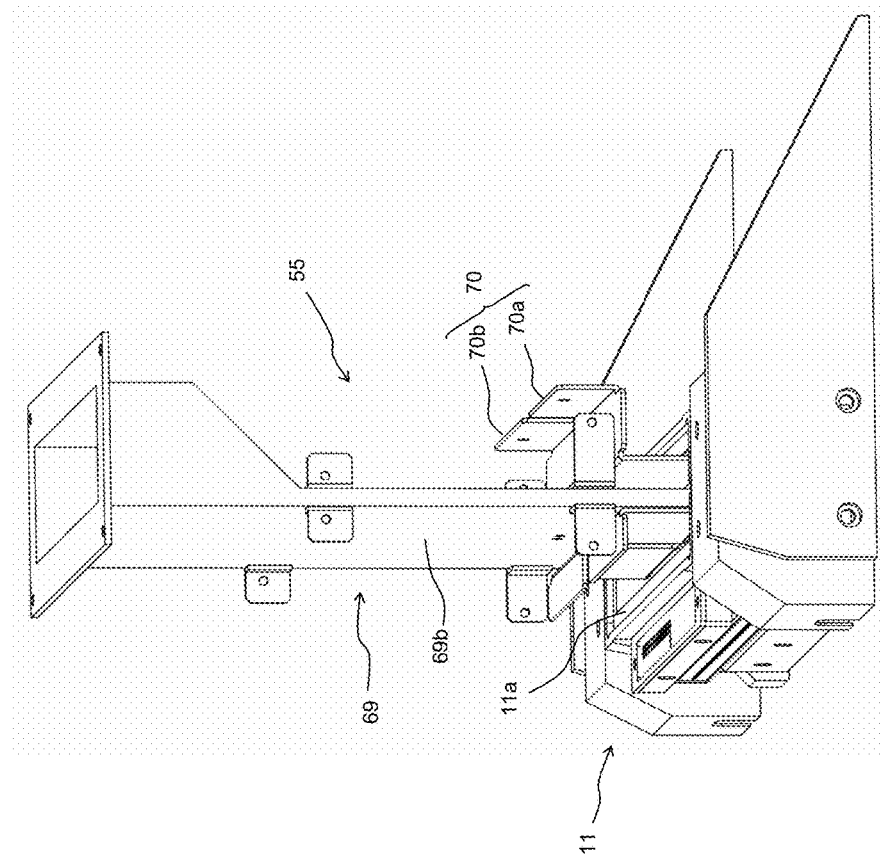
FIG. 16 is a perspective view for explaining the method for filling the material powder into the recoater head 11.

A sensor to detect the amount of the material powder in the material holding section 11a is provided to the recoater head 11. As shown in FIGS. 15 to 16, when it is determined that the material powder need be supplied to the material holding section 11a, the recoater head 11 is moved to directly beneath of the intermediate duct 69, and the material powder is supplied.

Specifically, as shown in FIG. 15, the intermediate duct outlet 69a is first located at a position higher than the upper end of the material holding section 11a, and then the material holding section 11a is moved to directly beneath of the intermediate duct outlet 69a in a condition where the intermediate shutters 70a and 70b of the intermediate duct outlet 69a are shut.

Subsequently, as shown in FIG. 16, the intermediate duct 69 is moved so that the position of the intermediate duct outlet 69a is lower than the upper end of the material holding section 11a. The intermediate duct shutters 70a and 70b are opened in such condition, allowing discharge of the material powder from the intermediate duct outlet 69a. The material powder is discharged by its weight, and then the discharge of the material powder is terminated when the material powder in the material holding section 11a reaches the intermediate duct outlet 69a. Therefore, the material powder would not flow out from the material holding section 11a. Here, the material powder discharged from the intermediate duct outlet 69a can be the one supplied in the intermediate duct 69 beforehand, or can be the one supplied into the intermediated duct 69 by opening the main duct shutter 68 in the condition as shown in FIG. 16.

After discharging the material powder from the intermediate duct outlet 69a, the intermediate shutters 70a and 70b are shut, and then the intermediate duct 69 is raised to a position where the intermediate duct 69 does not interfere with the recoater head 11. Accordingly, supply of the material powder is completed.

EXPLANATION OF SYMBOLS

1: chamber
3: powder layer forming apparatus
5: molding table
8: material powder layer
11: recoater head
13: laser beam emitter
17: fume adhesion preventing section
26: powder retaining wall
27: powder discharging section
28: chute guide
31: driving mechanism
42: laser source
43a, 43b: galvanometer scanner
44: condensing lens
45: irradiation region
47: molded product
48: model of molded product
49: sliced layer
50: sintered layer
55: material supplying unit
68: main duct shutter 69: intermediate duct
70: intermediate duct shutter
72: main duct upper section
73: main duct lower section
74, 75: bellows
82. main duct
L: laser beam Although various exemplary embodiments have been shown and described, the invention is not limited to the embodiments shown. Therefore, the scope of the invention is intended to be limited solely by the scope of the claims that follow.

What is claimed is:

1. A lamination molding apparatus comprising:
a chamber covering a desired molding region and being filled with an inert gas having a desired concentration;
a recoater head moving in the chamber to supply a material powder on the molding region to form a material powder layer;
a material supplying unit to supply the material powder to the recoater head;
wherein the recoater head comprises: a material holding section to hold the material powder; and a material discharging opening to discharge the material powder in the material holding section;
the material supplying unit comprises: an intermediate duct to supply the material powder to the material holding section; a main duct to supply the intermediate duct with the material powder; and a driving mechanism to move the intermediate duct vertically;
the intermediate duct is configured to be capable of discharging the material powder from an intermediate duct outlet having an elongated shape;
the driving mechanism moves the intermediate duct vertically between a first position in which the intermediate duct outlet is lower than an upper end of the material holding section and a second position in which the intermediate duct outlet is higher than the upper end of the material holding section; and
the material supplying unit is controlled to discharge the material powder from the intermediate duct outlet in a condition where the intermediate duct is moved so that the intermediate duct outlet is located at the first position.

2. The lamination molding apparatus of claim 1, wherein the material discharging opening has an elongated shape; and
the intermediate duct outlet elongates in a direction substantially the same as the material discharging opening.

3. The lamination molding apparatus of claim 1, further comprising:
an intermediate duct shutter to open and shut the intermediate duct outlet;
wherein the intermediate duct shutter is controlled so that the intermediate duct outlet is opened in a condition where the intermediate duct outlet is located at a position lower than an upper end of the material holding section.

4. The lamination molding apparatus of claim 3, wherein the intermediate duct shutter is structured with at least two shutters capable of being controlled independently from each other.

5. The lamination molding apparatus of claim 1, wherein the intermediate duct comprises: a channel section elongating for a predetermined length from the intermediate duct outlet and having a constant cross-sectional area; and a widened section provided at an upper side of the channel section and having a wider cross-sectional area than the channel section.

6. The lamination molding apparatus of claim 1, wherein the main duct comprises a main duct lower section and a main duct upper section provided above the main duct lower section;
the material powder supplied to the main duct upper section is supplied to the intermediate duct via the main duct lower section; and
a main duct shutter to open and shut a passage in between the main duct lower section and the main duct upper section is provided.

7. The lamination molding apparatus of claim 6, wherein the main duct lower section comprises an expanding section, length of the expanding section in a longitudinal direction of the intermediate duct becoming longer as the expanding section comes closer to the intermediate duct.

8. The lamination molding apparatus of claim 1, wherein the main duct is configured to be capable of moving vertically in accordance with a weight of the material powder maintained in the main duct.

* * * * *